April 25, 1933.    J. G. DEITZ    1,905,623
DOOR MOUNT FOR ACESSORY EQUIPMENT OF MOTOR VEHICLES
Filed Feb. 8, 1929
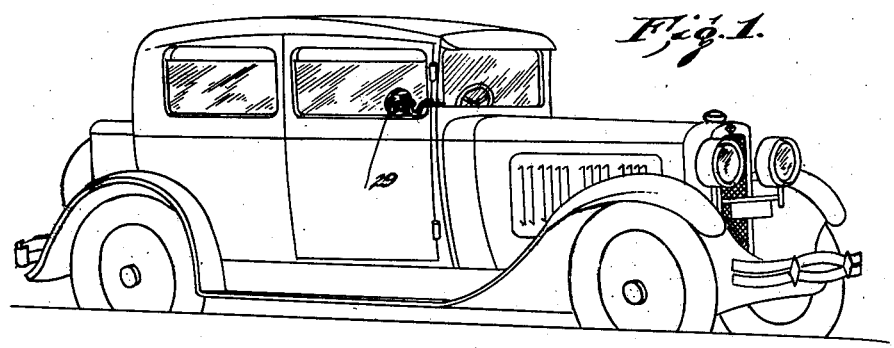
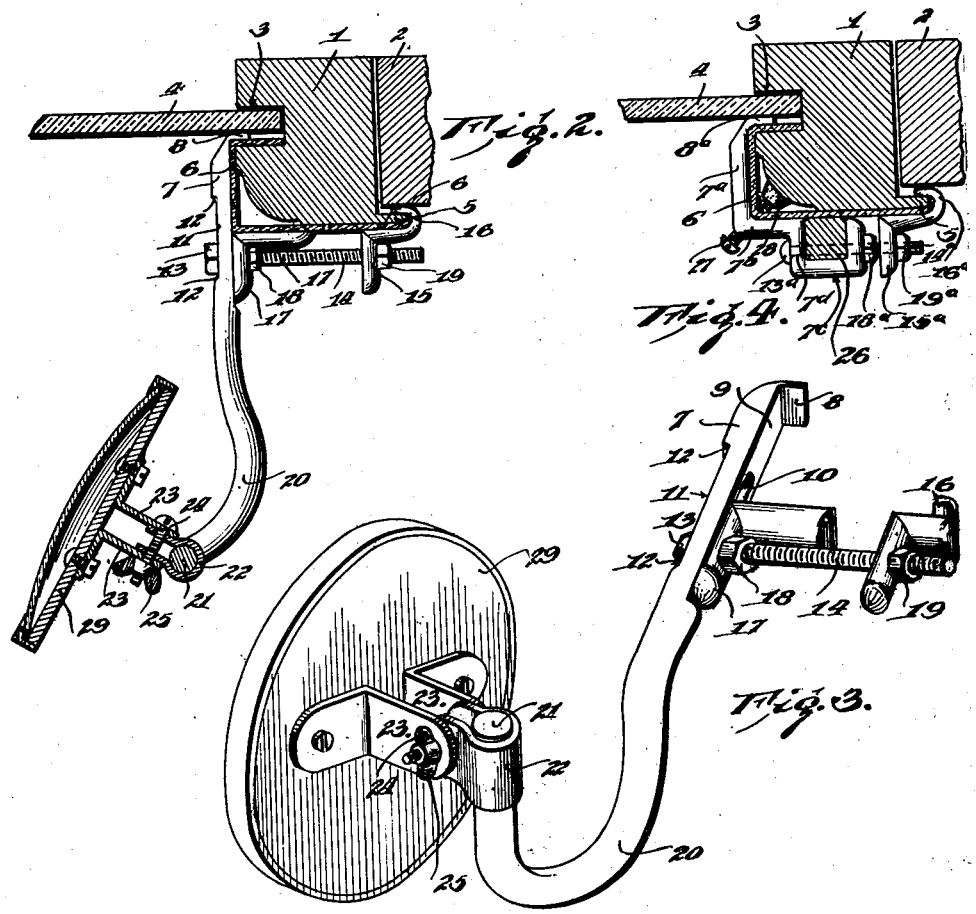
WITNESS
INVENTOR
J. G. Deitz
BY
ATTORNEY Patented Apr. 25, 1933

1,905,623

UNITED STATES PATENT OFFICE

JOHN G. DEITZ, OF TULSA, OKLAHOMA

DOOR MOUNT FOR ACCESSORY EQUIPMENT OF MOTOR VEHICLES

Application filed February 8, 1929. Serial No. 338,606.

This invention relates to the motor vehicle art, and is more particularly concerned with an exterior accessory supporting clamp or bracket designed to be detachably clamped to the stile of a motor vehicle door without interference with its normal functioning and without marring the door.

In mounting exterior accessory equipment such as mirrors, spot lights, wind deflectors or side wind shields upon motor vehicle bodies it has been heretofore necessary to drill through and mar the body for the attachment of brackets with the added disadvantage of fixity of position, once attached.

In accordance with my invention, I have provided an accessory supporting bracket formed for clamping engagement with door stiles, without drilling or marring and with the added advantage of adjustability in placement and ease of removal.

In modern motor vehicle body construction, door stiles of closed vehicle bodies or cabs at their jamb edges have edge flanges or beading overlying the edge of the jamb with appreciable clearance, particularly at the hinge jamb, and are provided with glass channels vertically of their inner side faces in which the door glass seats with appreciable clearance between the edges of the glass and the sides of the channel.

In designing the accessory supporting bracket or mount of the present invention, I have taken advantage of these features and have provided a sectional bracket having portions engaging in and over the glass channel and jamb edge flange or beading and relatively adjustable to fit door stiles of different widths and thicknesses and to clamp the sections of the bracket together and to the door stile, the structure of the bracket or mount structure being designed to engage or be attached to an accessory such as mirror, spot light, or wind deflector frame which is to be supported exteriorly of the vehicle body by the bracket. The invention itself consists in features of construction and combinations and arrangements of parts as hereinafter described and claimed and in a preferable form is illustrated in the accompanying drawing forming part hereof and in which:—

Figure 1 is a perspective view of a closed passenger vehicle having the bracket of the present invention attached to the front stile of a door and supporting a rear view mirror.

Figure 2 is a fragmentary horizontal section through the door stile and window on an enlarged scale.

Figure 3 is a perspective view of the bracket mount and mirror detached.

Figure 4 is a horizontal sectional view through a mounting bracket designed to support the frame of a side wind deflector or shield showing the bracket structure modified for that purpose.

In the sectional view of Figure 2, the line of section is taken above the glass line of the door 1 designating the front door stile at the hinging end of the door and 2 the jamb of the door at said end. The stile 1 on its rear side face is provided with the usual glass channel 3 mounting the usual window glass 4 and having at its front face at its jamb edge an extension flange or beading 5 offset outwardly from and extending beyond the space between the door stile 1 and the jamb 2.

The accessory mount forming the subject matter of the present invention comprises, as shown in Figures 2 and 3, an accessory supporting arm 7 which extends outwardly substantially at right angles to the face of the door and is provided at its inner end with a thin lateral extension 8 insertible within the glass channel 3 to overlie the outer side of the channel and with a flat inner face 9 to abut the rear side face of the stile. The arm 7 is provided with a longitudinal slot 10 therein extending from its flat inner face 9 transversely through the arm whose outer face is cut down or otherwise channeled to provide a flat surface 11 through which the slot 10 extends, edged by shoulders 12 at its opposite ends substantially at the ends of the slot 10.

The head 13 of a bolt 14 is intended to rest against the flat face 11 of the support arm and extends through the slot 10 in parallel with the outer face of the stile. At its forward extremity, a clamping angled plate 15 is bored to receive the bolt 14 through one face thereof and is provided at the extremity of its other angled face with an offset or hooked portion 16 designed to engage over the back face of the covering flange or beading 5 for the jamb edge of the door, the inner face of this angled arm overlying the outer face of the flange or beading. A second angled plate 17 having flat inner faces engages the flat face 9 of the supporting arm 7 and overlies the adjacent face of the door stile and has the side engaging the supporting arm 7 bored in alinement with the angled plate 15 to permit the shank of the bolt to pass therethrough. A nut 18 threaded on this shank 14 clamps the plate 17 to the supporting arm and a second nut 19 threading on the supporting end of the bolt 14 engages the angled plate 15 and draws its hooked end 16 tightly against the edge of the stile flange 5, coincidentally drawing the supporting arm 7 firmly against the rear face of the stile and the door stile side of the plate 17 against the outer face of the stile, thereby bracing arm 7 in the desired position and maintaining its hooked end 8 in the glass groove 3. The bolt 14 with its angled plates 15 and 17 may be moved longitudinally of the slot 10 to adapt the mount to door stiles of different thicknesses and the end angled plate 15 is, obviously, adjustable upon the bolt 14 to accommodate the mount to door stiles of different widths. To prevent marring of the finish of the door stile, a strip or strips 6 of felt or other non-abrasive material is interposed between the stile and the overlying portions of the bracket members and may be a strip separate therefrom or attached thereto by adhesive as a facing.

In Figures 2 and 3 and also in Figure 1 the supporting arm 7 extends outwardly from the point of engagement therewith of the angled plate 17 and is rearwardly curved as at 20 and upturned to provide a standard 21 upon which is rotatably adjustable the hub portion 22 of a U-shaped clip to whose outer ends the ends of spaced ears 23 attached to the back of a rear view mirror 29 are pivoted. Conveniently a bolt 24 extends through alined bores in the overlapping ends of the clip 22 and ears 23 and a wing or other suitable nut 25 engages the outer end of the bolt and serves to clamp the ears in pivotally adjusted position on the clip and also to clamp the hub of the clip in adjusted position axially on the standard 21 of the bracket.

The nature of the accessory, however, and its specific construction does not enter into the present invention, the mirror being shown as illustrative of a specific accessory supported by the arm 7. As previously stated, this accessory may take the form of a spot light directed forwardly instead of rearwardly as is the mirror. The mount may also be used to support the frame of a side wind shield or wind deflector.

As shown in Figure 4, an accessory supported arm 7a having its inner end provided with a thin flange 8a extending into the glass channel, instead of extending straight outwardly as in the case of the mirror supporting arm is formed with a lateral offset 7b overlying the outer face of the stile 1 at its rear edge and is provided with a U-shaped socket 7c having its parallel horizontal wall 7d bored in alinement to permit the insertion therethrough of the shank of a bolt 14a, the head 13a of which engages the rear face of the rearmost side 7d of the socket. The front end of the bolt, as in the mirror type form of clamp, mounts an angled plate 15a having a hooked portion 16a engaging over the edge of the end beading or flange 5 of the door stile and similarly overlying the outer face of the edge flange or beading and is provided with a bore to receive the shank of the bolt 14a. A nut 19a serves to draw the hooked end 16a against the end of the flange or beading 5 and to draw the face of the arm 7a and its end flange 8a against the rear side of the stile and the outer face of the glass channel, respectively, clamping the mount to the door stile. The bracket arm 7a at the corner angle overlying the rear edge of the outer face of the door may be provided with a threaded bore to receive a stile edge clamping screw 27 having a rubber tipped inner end 28 adjustable inwardly and outwardly in adapting the bracket to stiles of varying corner contour and thickness.

The socket provided by the U-shaped portion 7c of the supporting arm 7a may receive a vertically extending end portion 26 of the frame of a wind deflector or shield such as is commonly used, this vertically extending portion 26 being embraced by sides 7d of the socket portion and held therein by a nut 18a on the bolt 14a. When used for supporting the frame of such an accessory, two pair of mounts are used, the upper and lower frames of the wind deflector having vertical portions 26 extending upwardly and downwardly respectively to seat in the sockets provided by the mount.

It will be observed that in this adaptation of the accessory mount to the described purpose, the same operative principles and the same fundamental structure is employed. This structure as disclosed represents a preferred form of the invention, but is susceptible of variation and modification and adaptation to different conditions of manufacture and use. The forms of the invention shown, therefore, are intended as illustrative rather than restrictive of the invention.

What I claim, therefore, and desire to secure by Letters Patent is:

1. In a vehicle body having a hinged door having a glass channel therein and having a flange extending from a vertical side edge to overlie the jamb edge of the door casing, an accessory supporting bracket overlying and detachably mounted on the outer face of the door stile between its glass channel and edge flange and having members provided with portions insertible in the glass channel bordering the stile and over said jamb edge flange, with means for effecting relative movement of said members to clamp said portions thereof to a wall of said glass channel and to said edge flange.

2. In a vehicle having a hinged door having a glass channel therein and having a flange extending from a vertical side edge to overlie the jamb edge of the door casing, and a bracket detachably mounted on the exterior of the stile of said door between its glass channel and said edge flange said bracket comprising complemental members having end portions seating in said glass channel and over said edge flange, and means for drawing said members together to cause their end portions to grip a wall of said glass channel and said edge flange and clamp the bracket to the door stile, said bracket having an accessory supporting arm extending outwardly from the door stile.

3. In a vehicle body having a hinged door having a glass channel therein and having a flange extending from a vertical side edge to overlie the jamb edge of the door casing, and a bracket detachably mounted on the exterior of the door stile and having an accessory supporting arm extending outwardly from said stile, said bracket including complemental stile clamping arms having opposed end offsets seating in said glass channel and over said door edge flange, respectively, with means for relatively adjusting said arms to clamp their end offsets to, and to release them from engagement with a wall of said glass channel and said end flange.

4. A clamp for use on vehicle doors of the type having a sash frame with a stile formed with a sash groove or channel in its inner side face and a flange projecting from its outer side face, distinguished by two relatively adjustable clamping members, one formed to engage the inner side face of the stile and provided with a projection for extending into the channel or groove of a thickness not to interfere with the sliding of the sash in the groove, and the other with a portion for engaging the outer or front face of the flange and a portion for extending around the flange and engaging behind the latter.

5. A clamp for use on vehicle doors of the type having a sash frame with a stile formed with a sash groove or channel in its inner side face and a flange projecting from its outer side face, distinguished by two relatively adjustable clamping members, one formed to engage the inner side face of the stile and provided with a projection for extending into the channel or groove of a thickness not to interfere with the sliding of the sash in the groove, and the other with a portion for engaging the outer or front face of the flange and a portion for extending around the flange and engaging behind the latter, a rod connecting said clamping members, and means adjustably connecting one of said members to the rod for adjustment in the direction of the length of the rod.

6. A clamp for use on vehicle doors of the type having a sash frame with a stile formed with a sash groove or channel in its inner side face and a flange projecting from its outer side face, distinguished by two relatively adjustable clamping members, one formed to engage the inner side face of the stile and provided with a projection for extending into the channel or groove of a thickness not to interfere with the sliding of the sash in the groove, and the other with a portion for engaging the outer or front face of the flange and a portion for extending around the flange and engaging behind the latter, a rod connecting said clamping members, and means for adjustably connecting one of said members to the rod to permit the adjustment of said member transversely of the rod to adapt the clamp to different forms of stiles.

7. A clamp for use on vehicle doors of the type having a sash frame with a stile formed with a sash groove or channel in its inner side face and a flange projecting from its outer side face, distinguished by two relatively adjustable clamping members, one formed to engage the inner side face of the stile and provided with a projection for extending into the channel or groove of a thickness not to interfere with the sliding of the sash in the groove, and the other with a portion for engaging the outer or front face of the flange and a portion for extending around the flange and engaging behind the latter, a rod connecting said clamping members, means adustably connecting one of said members to the rod, and means adustably connecting the other clamping member to the rod for adjustment in a direction transversely of the length of the rod.

8. A clamp for use on vehicle doors of the type having a sash frame with a stile formed with a sash groove or channel in its inner side face and a flange projecting from its outer side face, distinguished by two relatively adjustable clamping members, one of said members having a portion for entering the sash channel and of a thickness not to interfere with the sliding of a sash in the channel, and the other of which has a portion for engaging the rear face of the flange and of a thickness not to interfere with the closing of the door.

9. A clamp for use on hinged vehicle doors having a glass channel therein and having a flange extending from a vertical side edge to overlie the jamb edge of the door casing, an accessory supporting bracket overlying and detachably mounted on the outer face of the door stile between its glass channel and edge flange comprising a pair of clamping members including an accessory supporting arm having an end portion seating in said glass channel, said arm extending outwardly at substantially right angles to said outer face of the door stile and having a slot formed longitudinally thereof, the other clamping member having a portion engaging over said flange, a bolt connecting said clamping members and extending through said longitudinal slot, and an angle plate carried by said arm having one side engaging the outer face of said door stile and the other side extending outwardly therefrom and engaging the adjacent face of said arm.

10. In combination with an automobile door having a window opening provided with a window, there being a narrow deep slot between the window and a vertical part of that portion of the door forming the frame for the opening, article supporting bracket members hooked around the vertical part on opposite sides thereof, one of the members having a portion disposed in the slot, the portion being narrower than the slot so that it is clear of the window.

11. In a vehicle body having a hinged door having a glass channel therein and having a flange extending from a vertical side edge to overlie the jamb edge of the door casing, an accessory supporting bracket clamp overlying and detachably mounted on the outer face of the door stile between its glass channel and edge flange and having clamping members provided with portions insertible in the glass channel bordering the stile and over said jamb edge flange, with means adjustably connecting said clamping members providing adjustment in the direction widthwise of said stile, and said means being adjustably mounted lengthwise of the bracket.

Signed at Tulsa in the county of Tulsa and State of Oklahoma this 30th day of January A. D. 1929.

JOHN G. DEITZ.